United States Patent [19]
Gibson

[11] Patent Number: 5,430,364
[45] Date of Patent: Jul. 4, 1995

[54] CURRENT HARMONIC, CURRENT FORM FACTOR AND POWER FACTOR MODIFICATION UNIT FOR RECTIFIER SUPPLIED LOADS

[75] Inventor: John A. Gibson, Richmond Hill, Canada

[73] Assignee: John A. Gibson, Richmond Hill, Canada

[21] Appl. No.: 224,999

[22] Filed: Apr. 7, 1994

Related U.S. Application Data
[63] Continuation of Ser. No. 812,011, Dec. 23, 1991, abandoned.

Foreign Application Priority Data
Jan. 23, 1991 [CA] Canada .................................. 2034824

[51] Int. Cl.$^6$ ................................................. G05F 1/70
[52] U.S. Cl. ..................................... 323/207; 323/222; 323/285; 363/80; 363/89
[58] Field of Search ..................... 363/37, 44, 81, 89, 363/79, 80, 95, 97, 124, 126; 323/207, 222, 282, 285, 299

[56] References Cited
U.S. PATENT DOCUMENTS

| | | | |
|---|---|---|---|
| 4,672,300 | 6/1987 | Harper | 323/222 |
| 4,677,366 | 6/1987 | Wilkinson et al. | 323/222 |
| 4,780,660 | 10/1988 | Shima et al. | 323/207 |
| 4,845,605 | 7/1989 | Steigerwald | 363/21 |
| 4,964,029 | 10/1990 | Severinsky et al. | 363/80 |
| 4,974,141 | 11/1990 | Severinsky et al. | 363/81 |
| 5,001,620 | 3/1991 | Smith | 363/89 |
| 5,019,952 | 5/1991 | Smolenski et al. | 363/16 |
| 5,047,912 | 9/1991 | Pelly | 363/89 |

Primary Examiner—Thomas M. Dougherty
Assistant Examiner—Adolf Berhane
Attorney, Agent, or Firm—Neil H. Hughes; Ivor M. Hughes

[57] ABSTRACT

A device for connecting in series between a source of alternating current power and a direct current load which decouples the power flow from the source to the load and thereby enables efficient modification of the current waveform supplied by the source to reduce current harmonics, improve the current form factor and improve the power factor. Particular uses for the device include battery chargers, off-line switching power supplies as used by computers, electronic ballasts for fluorescent tubes and variable speed electric motor controls.

7 Claims, 4 Drawing Sheets

CURRENT HARMONIC, CURRENT FORM FACTOR AND POWER FACTOR MODIFICATION UNIT FOR RECTIFIER SUPPLIED LOADS

This application is a continuation of application Ser. No. 07/812,011, filed Dec. 23, 1991, now abandoned.

FIELD OF THE INVENTION

This invention relates to a device (and electrical power control circuitry therefore) for interposing between a source of alternating electric power and a direct current load so as to greatly reduce the peak of current flow from the source and to substantially increase the duration of time that current flows from the source to the device and load in combination during each cycle of the source thereby reducing the source current form factor and current harmonics and improving the power factor of the power supplied to the deuce and load in combination.

The device comprises a rectifier module, a current energy storage module, a current directing switch module, current and voltage transducers and a control module to operate the current directing switch module in response to a number of inputs.

BACKGROUND OF THE INVENTION

The increasing use of battery chargers, switch mode power supplies for computers, electronic ballasts for fluorescent tubes, variable speed electric motor controls and other similar equipment all have the potential to dramatically increase the current waveform distortion of power generated by alternating current sources. These current waveform distortions reduce the ability of a distribution system to transmit power and cause conductive interference with other equipment connected to the source.

Circuits for altering the characteristics of loads as seen by the source and thereby reduce the current waveform distortion have been known for many decades and have been widely used such as capacitors, inductors, synchronous capacitors, motor generator sets, ferroresonant transformers and filter and trap networks made up of these and other passive and active components. The components of these circuits are bulky, cumbersome, expensive, noisy and in general are not responsive to changes in the load requirements.

More recently, a number of prior art inventions have provided mechanisms for providing unity power factor by using switching power supply synchronisation to the input voltage waveform. These mechanisms have not specifically addressed the problems of harmonics and form factor, have been electronically complex and make no provision for introduction of outside signals to alter the current wave form.

In particular, European Patent Application 218,267 first published Apr. 15, 1987 by Kislowski uses a current signal derived from the output as well as internal circulating current to obtain a control signal thus making for complexity and no mention is made of form factor or harmonics.

Wilkinson et al. in U.S. Pat. No. 4,677,366 issued Jun. 30, 1987 use several internal signals into very complex signal management circuitry to obtain unity power factor making no mention of form factor or harmonics.

Bucher in U.S. Pat. No. 4,683,529 issued Jul. 28, 1987 uses complex electronic circuitry to obtain discontinuous or near discontinuous current which necessitates the filtering circuitry mentioned in the reference. No mention is made of form factor or harmonics. By switching between 0 and peak value currents with his system, the capability of providing significant RFI is generated as represented by his FIG. 8, neccessitating the complex filtering components of his FIG. 1.

Nowhere in the prior art is there found a device which in combination:
1) Limits the peak current to RMS value ratio,
2) Provides an in phase quasi sinusoidal current wave form,
3) Maintains virtually continuous current flow with minimum range of variation, thus providing improvements to the power factor, the current harmonics, current form factor and radio frequency interferance.

It is therefore an object of the invention to provide a means for altering the waveform of the current flow to a rectifier fed direct current load which is less complex.

It is a further object of the invention to provide a means for altering the waveform of the current flow to a rectifier fed direct current load which is less electronically and acoustically noisy and whereby load introduced disturbances into the power source are reduced.

It is a further object of the invention to provide a means for altering the waveform of the current flow to a rectifier fed direct current load whereby the power factor as seen by the power source is adjusted to more desirable levels.

It is a further object of the invention to provide a means for altering the waveform of the current flow to a rectifier fed direct current load whereby the harmonic content of the current supplied by the power source is adjusted to more desirable levels.

It is a further object of the invention to provide a means for altering the waveform of the current flow to a rectifier fed direct current load whereby the form factor of the current supplied by the power source is adjusted to more desirable levels.

It is a further object of the invention to provide a means for altering the waveform of the current flow to a rectifier fed direct current load whereby the load has increased isolation from power source disturbances.

It is a further object of the invention to provide a means for altering the waveform of the current flow to a rectifier fed direct current load which is responsive to changes in other loads Further and other objects of the invention will be apparent to those skilled in the art from the following Summary of the Invention and Description of a Preferred Embodiment of the Invention

SUMMARY OF THE INVENTION

According to one aspect of the invention there is provided an apparatus for connecting in series between a source of alternating current electrical power and a direct current load for decoupling the flow of power from the source to the load with said decoupling being arranged to maintain desired parameters of power flow such as current form factor, current harmonics, and power factor, to the combined device and load; such apparatus comprising;

(a) electrical connector means for interposing the apparatus between the current carrying components of the source and the load;

(b) an electric power rectifier to convert the current flow from alternating to direct;

(c) a current energy storage network to enable decoupling of the load from the source;

(d) an electrical power switching network to direct the flow of energy among the source, said current energy storage network and the load;

(e) at least one current sensor to provide signals concerning source current flow;

(f) at least one voltage sensor to provide signals concerning source voltage levels;

(g) electrical means responsive to said sensor signals which converts these said signals into control signals for said electrical switch network so as to maintain desired parameters of power flow from the source.

According to another aspect of the invention there is provided an apparatus for connecting in series between a source of rectified alternating current electrical power and a direct current load for decoupling the flow of power from the source to the load with said decoupling being arranged to maintain desired parameters of power flow such as current form factor, current harmonics, and power factor, to the combined device and load, such apparatus being in combination;

(a) electrical connector means for interposing the apparatus between the current carrying components of the source and the load;

(b) a current energy storage network to enable decoupling of the load from the source;

(c) an electrical power switching network to direct the flow of energy among the source, said current energy storage network and the load;

(d) at least one current sensor to provide signals concerning source current flow;

(e) at least one voltage sensor to provide signals concerning source voltage levels;

(f) electrical means responsive to said sensor signals which converts these said signals into control signals for said electrical switch network so as to maintain desired parameters of power flow from the source.

According to yet another aspect of the invention, a device is provided for being connected in series between a source of electric power and a direct current load (for example, the input filter capacitor of an electronic ballast for a fluorescent lamp), comprising;

(I) a series electrical power circuit comprising;
 (a) an electrical connector, such as one side of a male plug, for making the connection of one side of an electrical power supply to
 (b) one of the A.C. input nodes of an electrical power rectifier module, such as four power diodes connected as a full wave bridge having first and second A.C. input nodes and a D.C. positive node and a D.C. negative node, with the D.C. positive node of the electrical power rectifier connected to
 (c) one side of a current energy storage module, such as an inductor, whose other side is connected to the current input terminal of a current switch module such terminal being both
 (d)(1) the current input side of a current switch, such as the drain terminal of a field effect power transistor, the current output side of said current switch, which is also the storage current output terminal of said current switch module, such as the source terminal of said field effect power transistor, which is connected to the first side of a current transducer module for providing an instantaneous measure of current which is the rectified source line current and
 (d)(2) one side of a unidirectional switch, such as the anode side of a power diode, the second side of said unidirectional switch, such as the cathode side of said power diode, which is the load current output terminal of the current switch module, is connected to
 (e) the positive node of a-load, such as the input filter capacitor of an electronic fluorescent ballast, the negative node of which is in turn also connected to the first side of said current transducer module
 (f) making both the second side of said current switch and said negative node of the load connected to the first side of said current transducer module, such as one side of a very low value resistor, the second side of which is connected to the D.C. negative node of said electrical power rectifier
 (f) continuing via said electrical power rectifier to the other A.C. input node which is connected to
 (g) an electrical power connector, such as the other side of said male plug, for finally making connection to the other side of the electrical power supply and (II) a switch control module consisting of;
 (a) a first sensing circuit network, connected to said current transducer module, for providing a first electrical signal, such as a voltage, that is a measure of current flowing from the electrical power source, said sensing circuit network provides differing electrical signals (voltages) corresponding to when said current switch is off, on, and the instantaneous level of current flow from the source, and
 (b) a second sensing circuit network, connected to said D.C. positive node of said electrical power rectifier, for providing a second electrical signal, such as a voltage, that is a positive instantaneous measure of the voltage of the electrical power source, and
 (c) an electrical switch control network which takes :said first and second electrical signals and converts them, as is appropriate, into a digital "1'" or "0'" which is connected to the control terminal of said current switch, such as the gate terminal of said field effect power transistor thereby turning on or off said current switch, such a network in one embodiment constructed using a comparator integrated circuit and associated resistors.

According to a further aspect of the invention, a device is provided for being connected in series between a source of electric power and a direct current load (for example, the input filter capacitor of an electronic ballast for a fluorescent lamp):, comprising;

(I) a series electrical power circuit comprising;
 (a) an electrical connector, such as one side of a male plug, for making the connection of one side of an electrical power supply to
 (b) one of the A.C. input nodes of an electrical power rectifier module, such as four power diodes connected as a full wave bridge having first and second A.C. input nodes and a D.C. positive node and a D.C. negative node, with the D.C. positive node of the electrical power rectifier connected to (c) one side of a current energy storage module, such as an inductor, whose other side is connected to the current input terminal of a current switch module such terminal being both (d)(1) the current input side of a current switch, such as the drain terminal of a field effect power transistor, the current output side of said current switch, which is also the storage current output terminal of said current switch module, such as the source terminal of said field effect power transistor, which is connected to the first side of a current transducer module for providing an instantaneous measure of current which is the rectified source line current and (d)(2) one side of a unidirectional switch, such as the anode side of a power diode, the second side of said unidirectional switch, such as the cathode side of said power diode, which is the load current output terminal of the current switch module, is connected to (e) the positive node of a load, such as the input filter capacitor of an electronic fluorescent ballast, the negative node of which is in turn also connected to the first side of said current transducer module (f) making both the second side of said current switch and said negative node of the load connected to the first side of said current transducer module, such as one side of a very low value resistor, the second side of which is connected to the D.C. negative node of said electrical power rectifier (f) continuing via said electrical power rectifier to the other A.C. input node which is connected to (g) an electrical power connector, such as the other side of said male plug, for finally making connection to the other side of the electrical power supply and (II) a switch control module consisting of;

(a) a first sensing circuit network, connected to said current transducer module, for providing a first electrical signal, such as a voltage, that is a measure of current flowing from the electrical power source, said sensing circuit network provides differing electrical signals (voltages) corresponding to when said current switch is off, on, and the instantaneous level of current flow from the source, a sensing circuit network in one embodiment being constructed using an operational amplifier integrated circuit and associated resistors and (b) a second sensing circuit network, connected to said D.C. positive node of said electrical power rectifier, for providing a second electrical signal, such as a voltage, that is a positive instantaneous measure of the voltage of the electrical power source, a sensing circuit network in one embodiment being constructed using an operational amplifier integrated circuit and associated resistors, and (c) a third sensing circuit network, connected to said positive node of the load, for providing a third electrical signal, such as a voltage, that is a measure of the positive instantaneous voltage of the load, such a sensing circuit network in one embodiment being constructed using an operational amplifier integrated circuit and associated resistors, and (d) an electrical signal processing network which takes said first, second, and third electrical signals and converts them, as is appropriate, into a digital "1" or "0" which is connected to the control terminal of said current switch, such as the gate terminal of said field effect power transistor thereby turning on or off said current switch, such a network in one embodiment constructed using a comparator integrated circuit and associated resistors.

According to still yet another aspect of the invention, a device is provided for being connected in series between a source of electric power and the input filter capacitor of an electronic ballast for a fluorescent lamp, comprising;

(I) a series electrical power circuit comprising;

(a) an electrical connector, such as one side of a male plug, for making the connection of one side of an electrical power supply to (b) one of the A.C. input nodes of an electrical power rectifier, such as four power diodes connected as a full wave bridge having first and second A.C. input nodes and a D.C. positive node and a D.C. negative node, with the D.C. positive node of the electrical power rectifier connected to (c) one side of an inductor, whose other side is connected to the current input node of a current switch module such node being connected to both (d)(1) an input terminal of a current switch, such as the drain terminal of a field effect power transistor, whose output terminal, such as said transistor's source terminal, is connected to the first side of a current measuring low value resistor (d)(2) the anode side of a power diode, the cathode side of which is connected to (e) the positive node of the input filter capacitor of an electronic fluorescent ballast, the negative node of which is in turn also connected to the first side of said current measuring low voltage value resistor (f) making both the switch output terminal and the negative node of the load connected to the first side of the low value resistor, the second side of which is connected to the D.C. negative node of said electrical power rectifier (f) continuing via said electrical power rectifier to the other A.C. input node which is connected to (g) an electrical power connector, such as the other side of said male plug, for finally making connection to the other side of the electrical power supply and (II) a switch control module consisting of;

(a) a first sensing circuit network, connected to said current measuring resistor, for providing a first electrical signal, such as a voltage, that is a measure of current flowing from the electrical power source, said sensing circuit network provides differing electrical signals (voltages) corresponding to when said current switch is off, on, and the instantaneous level of current flow from the source, a sensing circuit network in one embodiment being constructed using an operational amplifier integrated circuit and associated resistors and (b) a second sensing circuit network, connected to said D.C. positive node of said electrical power rectifier, for providing a second electrical signal, such as a voltage, that is a positive instantaneous measure of the voltage of the electrical power source, a sensing circuit network in one embodiment being constructed using an operational amplifier integrated circuit and associated resistors, and (c) a third sensing circuit network, connected to said positive node of the load, for providing a third electrical signal, such as a voltage, that is a measure of the positive instantaneous voltage of the load, such a sensing circuit network in one embodiment being constructed using an operational amplifier integrated circuit and associated resistors, and (d) an electrical signal processing network which takes said first, second, and third electrical signals and converts them, as is appropriate, into a digital "1'" or "0'" which is connected to the control terminal of said current switch, such as the gate terminal of said field effect power transistor thereby turning on or off said current switch, such a network in one embodiment constructed using a comparator integrated circuit and associated resistors. In an alternative embodiment the current switch is a bipolar transistor preferably which may have an isolated base.

DETAILED DESCRIPTION OF A PREFERRED EMBODIMENT OF THE INVENTION

Figure 1:
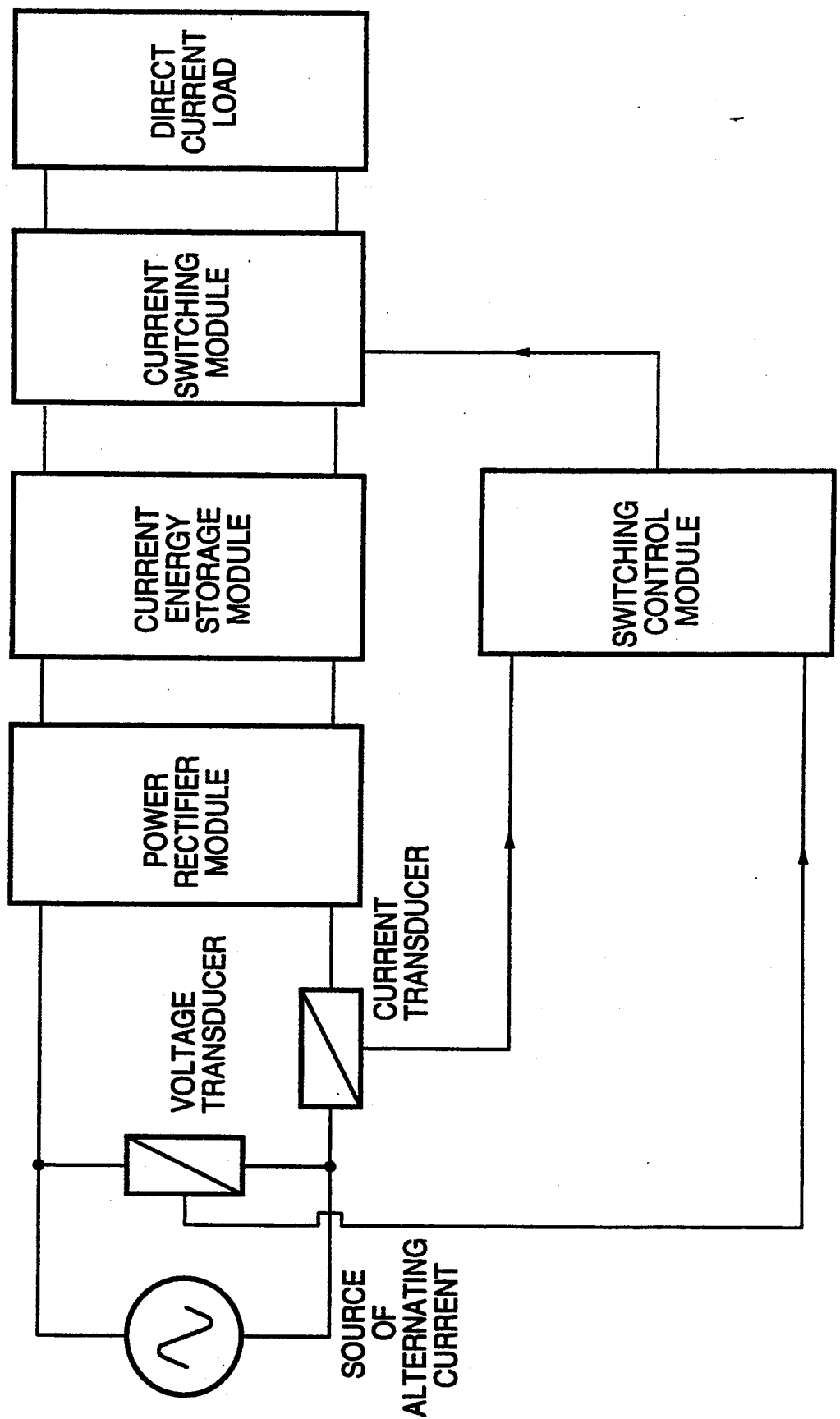
FIG. 1 is a system and functional block diagram of a device constructed according to a preferred embodiment of the invention.

In its system and functional block diagram embodiment the present invention includes, as shown in FIG. 1, electrical means for connecting to the commercial power supply, a rectifier module, a current energy storage module, a current switch module, electrical means for connecting to a direct current load, electrical supply current and voltage transducers, and a switching control module. These elements function as a system to decouple the power flow from the electric power source to the load so as to allow desirable management of current flows from the source.

A detailed circuit configuration of an embodiment of the invention will now be described in conjunction with FIGS. 1 and 2.

The circuit consists of two principal parts; the first, a series connected electrical power circuit, which performs the functions of connecting to the power supply and to the load, performing the rectification to direct current, and regulating the flow of current to the load; the second, an electronic switching control circuit, which performs the functions of sensing the flow of current from the power supply, sensing the instantaneous voltage of the power supply, sensing the instantaneous voltage of the load input, combining and converting these sensed signals into reference and level signals to a comparator whose output controls the current regulating function of the power circuit.

The power circuit is connected via electrical means, such as a first male blade 10 of a plug, to one side of the power supply 1 which is the commercially available electricity supply at 120 volts 60 Hertz. In series with blade 10 is one alternating current terminal, node 201, of 2 ampere bridge rectifier 2. The positive direct current terminal of 2, node 202, is connected to the first side of the 1 millihenry, 1 ampere inductor 3. The second side of 3, node 203, is connected to both the anode side of 2 ampere diode 4 and the drain terminal of power field effect transistor 5, being type IRF722. The cathode side 4, node 204, is connected to both the positive terminal of the 250 microfarad filter capacitor 6 and the positive terminal of the electronic fluorescent ballast, represented by the non-linear impedance 7. The negative side of 6 and 7, node 205, is connected to both the drain terminal of 5 and one side of 5.6 ohm resistor 9. The other side of 9, node 206, is connected to the negative direct current terminal of 2. The other alternating current terminal of 2 completes the power circuit via a second male blade 11 of said plug to power supply 1.

The switching control circuit begins with a line current sensing network consisting of 10,000 ohm resistor 16, 100,000 ohm resistor 17 and 100 picofarad resistor 32. This network divides approximately by 0.9 and is a 0.1 microsecond noise filter of the signal at node 205, which is now a positive instantaneous analog of current flowing from power supply 1. This analog is presented at node 210 to the negative input of comparator 25, being ¼ of a dual/dual amplifier-comparator integrated circuit as manufactured by Motorola Inc. as part number MC14575. The next network is a reference network made up of a base voltage obtained by dividing the electronic power supply 30 voltage (+9 volts) by a voltage divider made up of 240,000 ohm resistor 34, and 10,000 ohm resistor 35, modified by a signal from node 202 via 1,000,000 ohm resistor 33 to establish a reference at node 215. This reference is further modified by the hysteresis feedback of the comparator output through 1,500,000 ohm resistor yielding a signal of approximately [+0.360+1.70|sin377t|±0.06]volts connected to the non-inverting (+) terminal of comparator 25.

The switching control consists of comparator 25 and 47 ohm resistor 29. The output of comparator 25 drives the gate terminal of transistor 5 through resistor 29 in the positive direction to approximately +9 volts when voltage at node 210, is less than node 215 and to 0 volts when node 210 is more than node 215.

Figure 2:
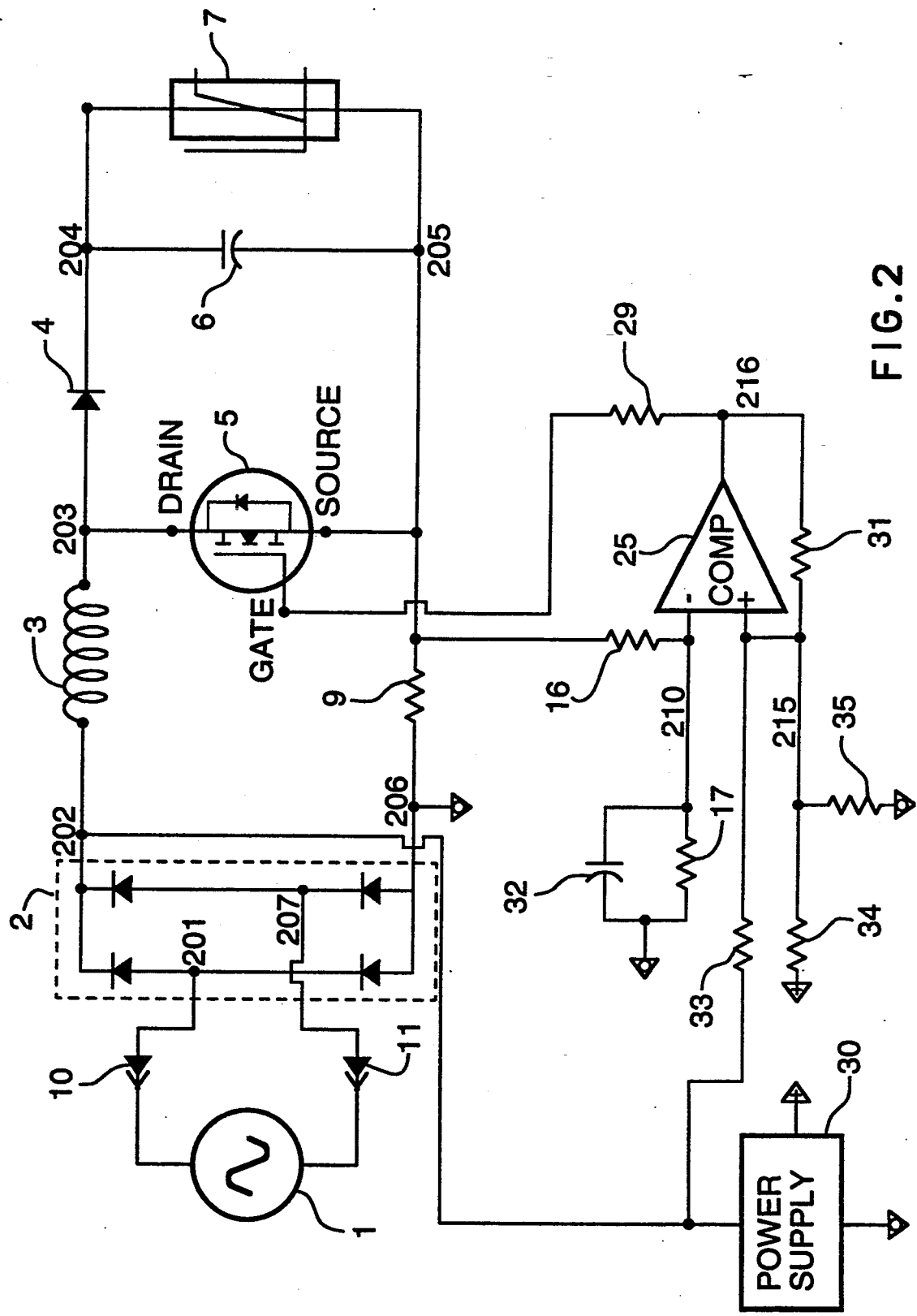
FIG. 2 is a drawing of the electrical circuit of a preferred embodiment of the invention shown in FIG. 1 including connection to a source of alternating current electrical power and the input capacitor of a direct current load.
Figure 3:
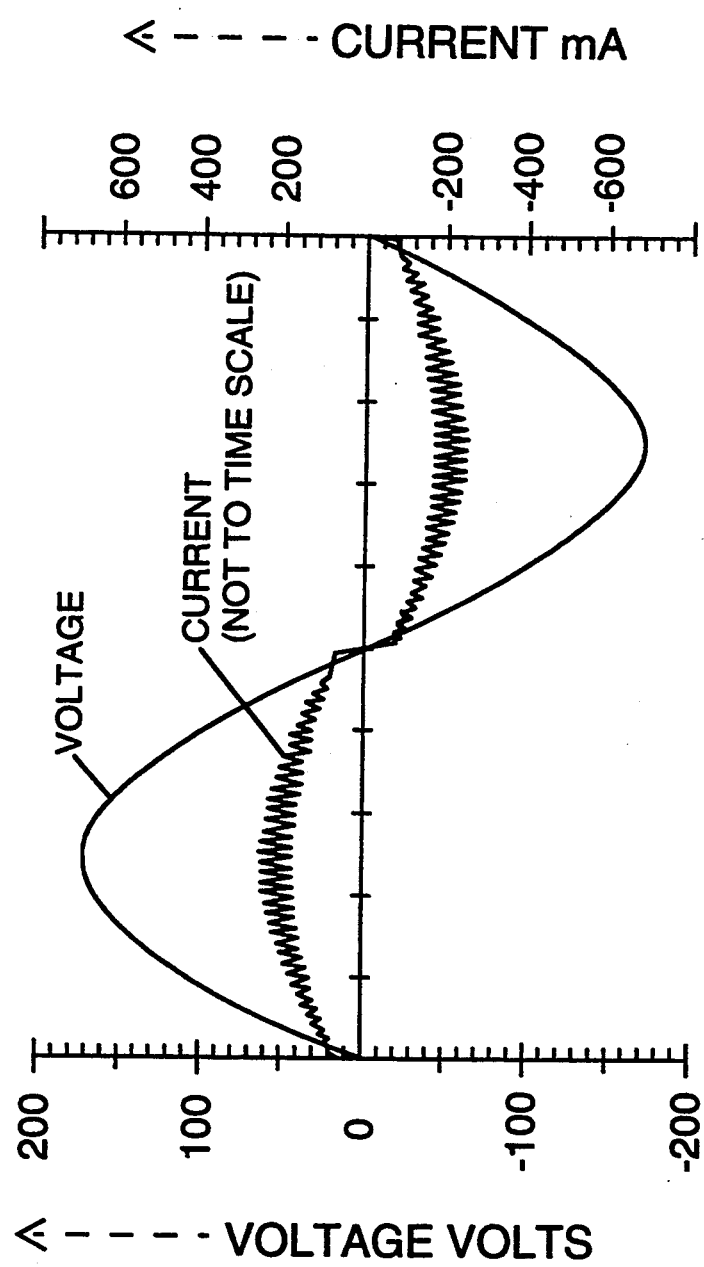
FIG. 3 is a representation of the voltage and current waves of a source of alternating current power during normal device operation.

The operation of the invention as embodied in the circuit of FIG. 2 will now be more particularly described in conjunction with FIG. 3.

Assume that supply 30 is powered, the voltage wave of source 1 is at zero commencing a positive excursion, no current is flowing and there is no voltage at node 204. In this state switch 5 will be turned on because node 215 will be higher than node 210. As the source voltage V increases, current will flow through 3, 5, and 9, rising in value at approximately a rate of 1000×V A.C. amperes per second. In approximately 50 microseconds, when the current reaches a value of approximately 85 milliamperes, the voltage level at node 210 exceeds that of node 215 and the comparator 25 turns switch 5 off. At this early stage of the voltage wave, approximately 1.5 volts, the effect of the voltage at node 202 is negligible. The energy stored in 3 by the flow of current in 3 is now available to charge the capacitor 6 by instituting a current flow through diode 4. This causes a decrease of current in 3 and simultaneously in 9. In approximately 1 microsecond the energy is transferred to the capacitor as the current decreases to approximately 60 milliamperes and the comparator 25 turns 5 on again and the switching cycle begins again. As the voltage of the supply increases, the influence of the voltage at node 215 increases and ever increasing levels of current in the power circuit are required to bring node 210 to a higher level than node 215 thus switching 5 off and, simultaneously, the level of current at which 5 switches back on again increases. At the peak of the voltage wave the observed current level is approximately 440 milliamps at peak and 280 milliamps at valley with a switch closed time (rising current, energy storage) of approximately 2 microseconds and a switch open time (energy transfer, falling current) of approximately 6 microseconds. Similarly as the supply voltage decreases ever decreasing levels of current are required to cause switch 5 to transfer. When the source goes through the negative half of its voltage cycle, the action of the rectifier causes node 202 to go through another positive cycle and the switching cycles of 5 are as described previously with the same current flows and energy transfers. The nature of the energy transfer out of the inductor into the capacitor is such that it will generate voltage as is required to transfer energy into the capacitor and hence to the load. By examining FIG. 3 with regard to the shape of the current and the phase relationship of the current to the voltage it can be seen that the current is virtually continuous, of approximately sinusoidal shape and in phase with the voltage wave. Thus the device provides a load which behaves approximately resistive with a high frequency sawtooth superimposed upon it.

A detailed circuit configuration of an embodiment of the invention will now be described in conjunction with FIG. 4.

The circuit consists of two principal parts; the first, a series connected electrical power circuit, which performs the functions of connecting to the power supply and to the load, performing the rectification to direct current, and regulating the flow of current to the load; the second, an electronic sensing and switching control circuit, which performs the functions of sensing the flow of current from the source of electrical power, sensing the instantaneous voltage of the source, as a safety feature, sensing the instantaneous voltage of the load input, providing an input for external signals, combining and converting these sensed signals into reference and level signals to a comparator whose output controls the current management function of the power circuit.

The power circuit is connected via electrical means, such as a first male blade 10 of a plug, to one side of the power supply 1 which is the commercially available electricity supply at 120 volts 60 Hertz. In series with blade 10 is one alternating current terminal, node 201, of 2 ampere bridge rectifier 2. The positive direct current terminal of 2, node 202, is connected to the first side of the 1 millihenry, 1 ampere inductor 3. The second side of 3, node 203, is connected to both the anode side of 2 ampere diode 4 and the drain terminal of power field effect transistor 5, being type IRF722. The cathode side 4, node 204, is connected to both the positive terminal of the 250 microfarad filter capacitor 6 and the positive terminal of the electronic fluorescent ballast, represented by the non-linear impedance 7. The negative side of 6 and 7, node 205, is connected to both the drain terminal of 5 and one side of 1.25 ohm resistor 8. The other side of 8, node 206, is connected to the negative direct current terminal of 2. The other alternating current terminal of 2 completes the power circuit via a second male blade 11 of said plug to power supply 1.

The electronic sensing and switching control circuit begins with a line current and voltage sensing network consisting of operational amplifier 12, being ¼ of a dual/dual amplifier-comparator integrated circuit as manufactured by Motorola Inc. as part number MC14575, 10,000 ohm resistor 13, 150,000 ohm resistor 14, 5,400,000 ohm resistor 15, 10,000 ohm resistor 16, and 100,000 ohm resistor 17. This network initially amplifies the voltage signal at node 205, representing the current flowing from power supply 1, with a gain of approximately 15 established by the ratio of resistors 14/13 at node 210. In addition, superimposed on the current signal at node 210 by subtraction is the voltage at node 202 multiplied by the gain factor of approximately 0.019 established by the ratio of resistors 14/15. Finally, it is possible to introducing suitably buffered signals at node 208 which further modify the the signal at node 210 in order to cause other desired changes in the operation of the device such as complimentarily offsetting the current waveshape of a second different load thereby improving the power factor and other parameters of the combined system.

The next network is a load voltage sensing network consisting of operational amplifier 18, being another ¼ of said amplifier-comparator integrated circuit, 1,500,000 ohm resistor 19, 20,000 ohm resistor 20, 100,000 ohm resistor 21, 10,000, ohm resistors 23 & 24 and 10,000,000 ohm resistor 22. The principal function of this load voltage sensing network is to provide a safety limit to the voltage at node 204 to a value that will not overstress circuit components in the event of loss of load such as the tube being removed in an electronic fluorescent ballast. This network does not normally take part in the operation of the invention. By sensing the load voltage level at node 204 the network is arranged to reduce the voltage at node 214 very rapidly to a low level, typically less than 0.2 volts, whenever the voltage at node 204 exceeds approximately 350 volts. A brief description of the network operation is as follows. The electronic power supply 30 voltage (+9 volts) is divided by a voltage divider made up of resistors 23 & 24 to establish a reference at node 213. This reference (+4.5 volts) is connected to the non-inverting (+) terminal of operational amplifier 18. The load voltage at node 204 is divided at node 211 by a voltage divider made up of resistors 19 & 20 to a ratio of approximately 0.013. Node 211 is connected via resistor 21 to the inverting (−) terminal of operational amplifier 18, node 212. This node 212 is also connected to one side of resistor 22 the other side of which is connected to the output terminal of 18, node 214. The effect of this network is to have the voltage at node 214 be virtually at electronic power supply 30 voltage (approx. +9 volts) whenever the voltage at node 204 is less than approximately 335 volts and node 214 to be at less than 0.2 volts whenever node 204 is greater than approximately 350 volts.

The switching control network consists of comparator 25 being a third ¼ of said amplifier-comparator integrated circuit, 240,000 ohm resistor 26, 36,000 ohm resistor 27, 1,500,000 ohm resistor 28 and 47 ohm resistor 29. This network operates using as reference the voltage at node 215 of approximately 1.25 volts which, in normal operation, is made up of the voltage at node 214 divided by the ratio of 26/27 modified by the feedback of 28 to provide approximately 0.2 volts of hysteresis between when the comparator 25 output is high (+9 volts) and low (0 volts). The output of comparator 25 now drives the gate terminal of transistor 5 through resistor 29 in the positive direction to approximately +9 volts when the output voltage of the line current and voltage sensing network, node 210, is less than node 215 and to 0 volts when node 210 is more than node 215.

Figure 4:
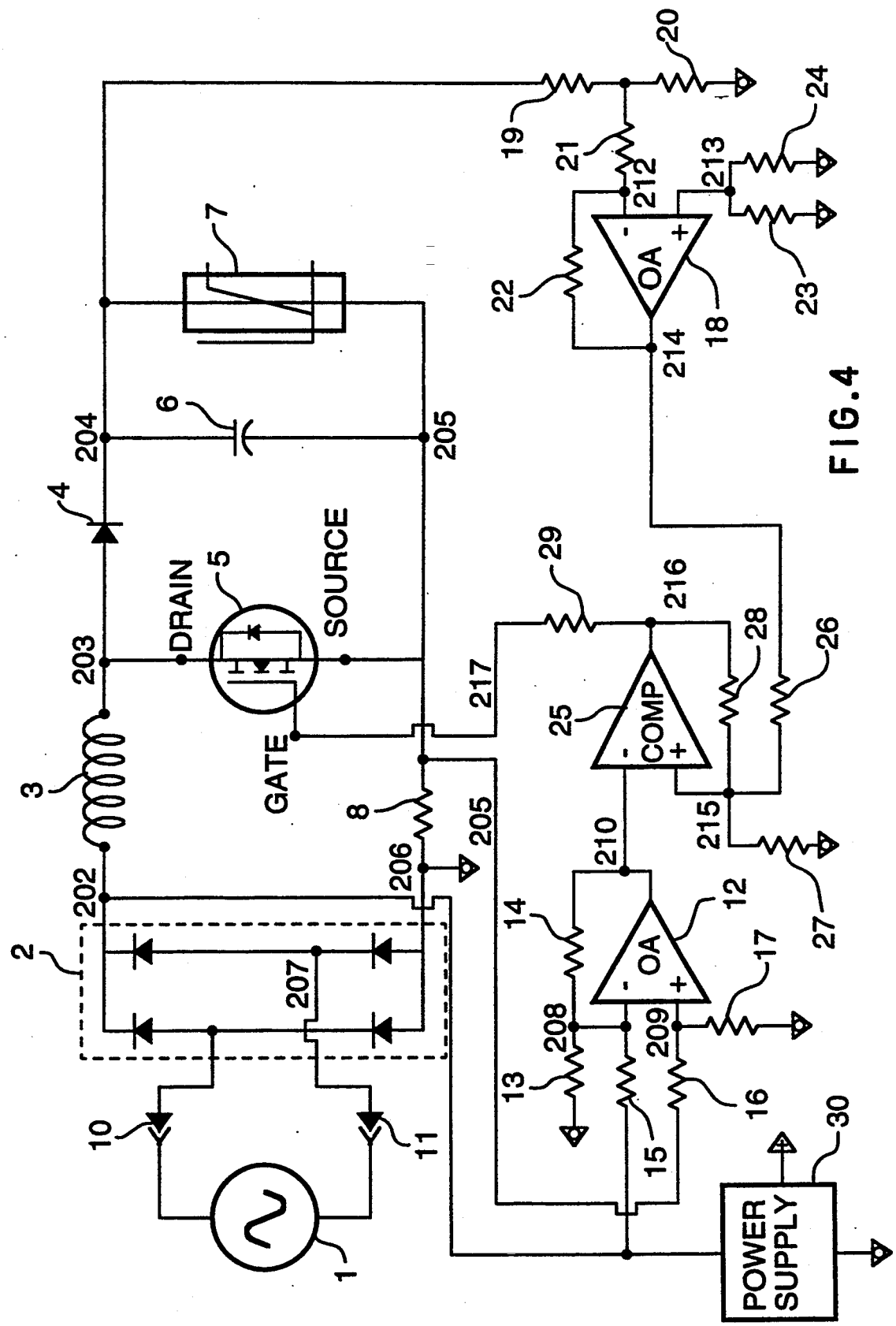
FIG. 4 is a drawing of a preferred embodiment of the invention shown in FIG. 1 incorporating safety overvoltage feature and provision for input of an outside signal.

The operation of the invention as embodied in the circuit of FIG. 4 will now be more particularly described in conjunction with FIG. 3.

Assume that supply 30 is powered, the voltage wave of source 1 is at zero commencing a positive excursion, no current is flowing and there is no voltage at node 204. In this state switch 5 will be turned on because node 215 will be higher than node 210. As the source voltage V increases, current will flow through 3, 5, and 8, rising in value at approximately a rate of 1000×V A.C. amperes per second. In approximately 50 microseconds when the current reaches a value of approximately 65 milliamperes, the voltage level at node 210 exceeds that of node 215 and the comparator 25 turns switch 5 off. At this early stage of the voltage wave, approximately 1.5 volts, the effect of the voltage at node 202 is negligible. The energy stored in 3 by the flow of current in 3 is now available to charge the capacitor 6 by instituting a current flow through diode 4. This causes a decrease of current in 3 and simultaneously in 8. In approximately 1 microsecond the energy is transferred to the capacitor as the current decreases to approximately 60 milliamperes and the comparator 25 turns 5 on again and the switching cycle begins again. As the voltage of the supply increases, the influence of the voltage at node 202 increases and ever increasing levels of current in the power circuit are required to bring node 210 to a higher level than node 215 thus switching 5 off and, simultaneously, the level of current at which 5 switches back on again increases. At the peak of the voltage wave the the current level is approximately 440 milliamps at peak and 280 milliamps at valley with a switch closed time (rising current, energy storage) of approximately 2 microseconds and a switch open time (energy transfer, falling current) of approximately 6 microseconds. Similarly as the supply voltage decreases ever decreasing levels of current are required to cause switch 5 to transfer. When the source goes through the negative half of its voltage cycle, the action of the rectifier causes node 202 to go through another positive cycle and the switching cycles of 5 are as described previously with the same current flows and energy transfers. The nature of the energy transfer out of the inductor into the capacitor is such that it will generate voltage as is required to transfer energy into the capacitor and hence to the load. By examining FIG. 3 with regard to the shape of the current and the phase relationship of the current to the voltage it can be seen that the current is both in phase with the voltage wave and of approximately sinusoidal shape. This provides a load which appears approximately resistive with a high frequency sawtooth superimposed upon it.

When an input power of 120 volts 60 hertz was connected to either of the embodiments described and load of a 30 watt electronic fluorescent ballast in combination was measured, the power factor was approximately +97 percent, the current form factor was approximately 1.6, and the 3rd, 5th, 7th, 9th, 11th, and 13th harmonics of current were all less than 4 percent with a total harmonic distortion of current of less than 7 percent. By comparison, the same load connected directly to the source had power factor of approximately −48 percent, form factor approximately 3.6 and total harmonic distortion approximately 170 percent.

By removing the network connected between nodes 202, 204, 205, 206, and 217 of FIG. 4 and replacing it with one that varied the switching of 5 in accordance with other algorithms in response to the inputs, other factors regarding the shape of the current wave could be implemented. For example, by altering the phase relationship of the current wave to "lead" the voltage wave, the load could now be used for power factor correction. In another variation, an additional input could be incorporated into the device to cause the current waveshape to complimentarily offset the current waveshape of a second different load thereby improving the power factor and other parameters of the combined system.

As many changes can be made to the embodiment of the invention without departing from the scope of the invention, it is intended that all material be considered as illustrative of the invention and not in a limiting sense.

The embodiments of the invention in which an exclusive property or privilege is claimed are as follows:

1. A device is provided for being connected in series between a source of electric power and a direct current load (for example, the input filter capacitor of an electronic ballast for a fluorescent lamp), comprising;
   (I) a series electrical power circuit comprising;
   (a) an electrical connector, such as one side of a male plug, for making the direct connection of one side of an electrical power supply to
   (b) one of the A.C. input nodes of an electrical power rectifier module connected with the electrical connector means, such as four power diodes connected as a full wave bridge having first and second A.C. input nodes and a D.C. positive node and a D.C. negative node, with the D.C. positive node of the electrical power rectifier connected to
   (c) one side of a current energy storage module connected with a direct current terminal of the electric power rectifier module, such as an inductor, whose other side is connected to the current input terminal of a current switch module for controlling the source current and connected with the current energy storage network such terminal being both
   (d)(1) the current input side of a current switch, such as the drain terminal of a field effect power transistor, the current output side of said current switch, which is also the storage current output terminal of said current switch module, such as the source terminal of said field effect power transistor, which is connected to the first side of a current transducer module for providing an instantaneous measure of current which is the rectified source line current and (d)(2) one side of a unidirectional switch, such as the anode side of a power diode, the second side of said unidirectional switch, such as the cathode side of said power diode, which is the load current output terminal of the current switch module, is connected to (e) the positive node of a load, such as the input filter capacitor of an electronic fluorescent ballast, the negative node of which is in turn also connected to the first side of said current transducer module (f)(1) making both the second side of said current switch and said negative node of the load connected to the first side of said current transducer module, such as one side of a very low value resistor, the second side of which is connected to the D.C. negative node of said electrical power rectifier (f)(2) continuing via said electrical power rectifier to the other A.C. input node which is connected to (g) an electrical power connector, such as the other side of said male plug, for finally making connection to the other side of the electrical power supply and (II) a switch control module consisting of;

(a) a first sensing circuit network, connected to said current transducer module, for providing a first electrical signal, such as a voltage, that is a measure of AC current flowing from the electrical power source, said sensing circuit network provides differing electrical signals (voltages) corresponding to when said current switch is off, on, and the instantaneous level of AC current flow from the source, and (b) a second sensing circuit network, connected to said D.C. positive node of said electrical power rectifier, for providing a second electrical signal, such as a voltage, that is a positive instantaneous measure of the voltage of the electrical power source, and (c) an electrical switch control network which takes only said first and second current and voltage electrical signals and converts them, as is appropriate, into a digital "1'" or "0'" which is connected to the control terminal of said current switch, such as the gate terminal of said field effect power transistor thereby turning on or off said current switch.

2. Apparatus for connecting in series between a source of alternating current electrical power and a direct current load for decoupling the flow of power from the source to the load with said decoupling being arranged to maintain desired parameters of power flow such as current form factor, current harmonics, and power factor, to the combined device and load such apparatus being in combination;

(I) a series electrical power circuit comprising;

(a) an electrical connector, such as one side of a male plug, for making direct connection of one side of an electrical power supply to (b) one of the A.C. input nodes of an electrical power rectifier module connected with the electrical connector means, such as four power diodes connected as a full wave bridge having first and second A.C. input nodes and a D.C. positive node and a D.C. negative node, with the D.C. positive node of the electrical power rectifier connected to (c) one side of a current energy storage module connected with a direct current terminal of the electric power rectifier module, such as an inductor, whose other side is connected to both (d)(1) the current input side of a current switch for controlling the source current and connected with the current energy storage network, such as the drain terminal of a field effect power transistor, the current output side of said current switch, such as the source side of said field effect power transistor, which is connected to the first side of a current transducer module for providing an instantaneous measure of current which is the rectified source line current and (d)(2) one side of a unidirectional switch, such as the anode side of a power diode, the second side of said unidirectional switch, such as the cathode side of said power diode, is connected to (e) the positive node of a load, such as the input filter capacitor of an electronic fluorescent ballast, the negative node of which is in turn also connected to the first side of said current transducer module (f)(1) making both the second side of the current switch and the negative node of the load connected to the first side of said current transducer module, such as one side of a very low value resistor, the second side of which is connected to the D.C. negative node of the said electrical power rectifier (f)(2) continuing via said electrical power rectifier to the other A.C. input node which is connected to (g) an electrical power connector, such as the other side of said male plug, for finally making connection to the other side of the electrical power supply and (II) an electronic sensing and switch control module consisting of;

(a) a first sensing circuit network, connected to said current transducer module, for providing a first electrical signal, such as a voltage, that is a measure of AC current flowing from the electrical power source, said sensing circuit network provides differing electrical signals (voltages) corresponding to when said current switch is off, on, and the instantaneous level of AC current flow in the supply, and (b) a second sensing circuit network, connected to said D.C. positive node of said electrical power rectifier, for providing a second electrical signal, such as a voltage, that is a measure of the positive instantaneous voltage of the electrical power source, and (d) an electrical signal processing network which takes only said first, and second, current and voltage electrical signals and converts them, as is appropriate, into a digital "1'" or "0'" which is connected to the control terminal of said current switch, such as the gate terminal of said field effect power transistor thereby turning on or off said current switch.

3. The combination defined in claim 2, wherein the current switch is a bipolar power transistor.

4. The combination defined in claim 2, wherein the current switch is an isolated base bipolar power transistor.

5. An apparatus for connecting in series between a source of alternating current electrical power and the input filter capacitor of an electronic ballast for a fluorescent lamp for decoupling the flow of power from the source to the load with said decoupling being arranged to maintain desired parameters of power flow such as current form factor, current harmonics, and power factor, to the combined device and electronic ballast such apparatus being in combination;

(I) a series electrical power circuit comprising;
- (a) an electrical connector, such as one side of a male plug, for making direct connection of one side of an electrical power supply to
- (b) one of the A.C. input nodes of an electrical power rectifier connected with the electrical connector means, such as four power diodes connected as a full wave bridge having first and second A.C. input nodes and a D.C. positive node and a D.C. negative node, with the D.C. positive node of the electrical power rectifier connected to
- (c) one side of an inductor, whose other side is connected to the current input node of a current switch module for controlling the source current and connected with the current energy storage network, such node being connected to both
- (d)(1) an input terminal of a current switch, such as the drain terminal of a field effect power transistor, whose output terminal, such as said transistor's source terminal, is connected to the first side of a current measuring low value resistor
- (d)(2) the anode side of a power diode, the cathode side of which is connected to
- (e) the positive node of the input filter capacitor of an electronic fluorescent ballast, the negative node of which is in turn also connected to the first side of said current measuring low voltage value resistor
- (f)(1) making both the switch output terminal and the negative node of the load connected to the first side of the low value resistor, the second side of which is connected to the D.C. negative node of said electrical power rectifier
- (f)(2) continuing via said electrical power rectifier to the other A.C. input node which is connected to
- (g) an electrical power connector, such as the other side of said male plug, for finally making connection to the other side-of the electrical power supply and (II) a switch control module consisting of;
- (a) a first sensing circuit network, connected to said current measuring resistor, for providing a first electrical signal, such as a voltage, that is a measure of AC current flowing from the electrical power source, said sensing circuit network provides differing electrical signals (voltages) corresponding to when said current switch is off, on, and the instantaneous level of AC current flow from the source, and
- (b) a second sensing circuit network, connected to said D.C. positive node of said electrical power rectifier, for providing a second electrical signal, such as a voltage, that is a positive instantaneous measure of the voltage of the electrical power source, a sensing circuit network in one embodiment being constructed using an operational amplifier integrated circuit and associated resistors, and
- (d) an electrical signal processing network which takes only said first, and second, current and voltage electrical signals and converts them, as is appropriate, into a digital "1'" or "0'" which is connected to the control terminal of said current switch, such as the gate terminal of said field effect power transistor thereby turning on or off said current switch.

6. The combination defined in claim 5, wherein the current switch is a bipolar power transistor.

7. The combination defined in claim 5, wherein the current switch is an isolated base bipolar power transistor.

* * * * *